United States Patent [19]

Auphan

[11] 4,375,166

[45] Mar. 1, 1983

[54] ULTRASOUND EXAMINATION APPARATUS COMPRISING A MOSAIC OF TRANSDUCERS OF AN ELECTROSTRICTIVE MATERIAL

[75] Inventor: Michael J. Auphan, Paris, France

[73] Assignee: U.S. Philips Corporation, New York, N.Y.

[21] Appl. No.: 245,822

[22] Filed: Mar. 20, 1981

[30] Foreign Application Priority Data

Mar. 21, 1980 [FR] France ................................ 80 06295

[51] Int. Cl.³ ............................................ G01N 29/00

[52] U.S. Cl. ........................................ 73/628; 73/631; 73/900; 310/315; 310/368; 367/900

[58] Field of Search ................. 73/900, 628, 625, 631, 73/626, 629; 128/660; 367/155, 153, 900; 310/316, 358

[56] References Cited

U.S. PATENT DOCUMENTS

| | | | |
|---|---|---|---|
| 2,928,068 | 3/1960 | Samsel et al. | 310/358 |
| 2,956,184 | 10/1960 | Pollack | 310/358 |
| 4,016,862 | 4/1977 | Lancee et al. | 73/900 |
| 4,205,555 | 6/1980 | Hashiguchi | 73/900 |

*Primary Examiner*—Howard A. Birmiel
*Attorney, Agent, or Firm*—Jack E. Haken

[57] ABSTRACT

An ultrasound examination apparatus comprises a processing circuit for echo signals from a mosaic of ultrasonic transducers which are made of an electrostrictive material with a non-remanent polarization. These signals are applied to processing channels which comprise coupling means (10*i*) for coupling the electrodes of the transducers to a circuit (20) for generating a polarization voltage ramp whose waveform is the inverse of that of the attenuation curve of the ultrasonic signals in the structures examined. These coupling means, for example, an RC circuit (11*i*, 12*i*) or a transformer (13*i*) enable the polarization voltage to be applied to the electrodes while inhibiting the transmission to the part of the processing channels which is situated behind the coupling means.

3 Claims, 4 Drawing Figures

ULTRASOUND EXAMINATION APPARATUS COMPRISING A MOSAIC OF TRANSDUCERS OF AN ELECTROSTRICTIVE MATERIAL

The invention relates to an ultrasound examination apparatus, comprising at least one transducer for the repeated emission of ultrasonic signals and, for the reception of the ultrasonic signals, a mosaic of individual ultrasonic transducers which are made of an electrostrictive material with a non-remanent polarization which is applied to each individual transducer by a corresponding electrode which is connected to a polarization stage. A mosaic of transducers is to be understood to mean herein all multi-element transducers such as notably linear arrays or matrix networks.

It is known that an electrostrictive material can assume different states in accordance with the polarization whereto it is subjected. The invention has for its object to utilize this characteristic in the echo signal processing circuit of an apparatus of the described kind by utilizing the polarization voltage for imposing the same instantaneous sensitivity to a plurality of transducers used for reception.

To this end, the apparatus in accordance with the invention is characterized in that it comprises a processing circuit for the echo signals supplied by the individual transducers in which each of the processing channels associated with one or with several individual transducers comprises coupling means which serve to couple the electrodes to the polarization stage and which enable the application of a polarization voltage to each of the electrodes while inhibiting the transmission of this voltage to the part of the processing channels which is situated behind the coupling means, said polarization stage comprising a single circuit for generating a voltage ramp having a waveform which is approximately the inverse of the curve of the attenuation of the ultrasonic signals within the structures examined.

The use of an electrostrictive material in an apparatus of the kind to be described enables a single polarization voltage to be applied to all individual transducers of the mosaic, so that the same instantaneous sensitivity is obtained for the reception of ultrasonic echos by these transducers. However, when this sensitivity is varied in time by means of the polarization stage in order to make the polarization voltage (and hence the sensitivity) inversely proportional to the attenuation curve of the signals emitted and received, an identical gain compensation effect is obtained in all processing channels.

The essential advantage of the apparatus in accordance with the invention will now be clear: the processing circuit provided in this apparatus is simpler and more economical than the known realizations, because it enables the omission of multiplier circuits which are normally included in the gain compensation stages and which have to be exactly identical in each of the processing channels (for the precision of the processing) and, in spite of this simplicity, it enables a substantial dynamic range to be obtained and hence a substantial efficiency.

Other aspects and advantages of the invention will become apparent from the following description which will be given with reference to the accompanying diagrammatic drawings.

Figure 3A:
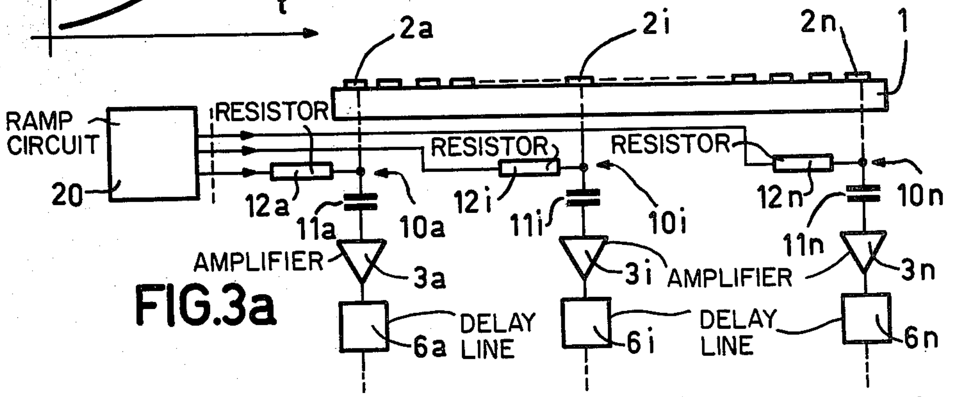
Figure 3B:
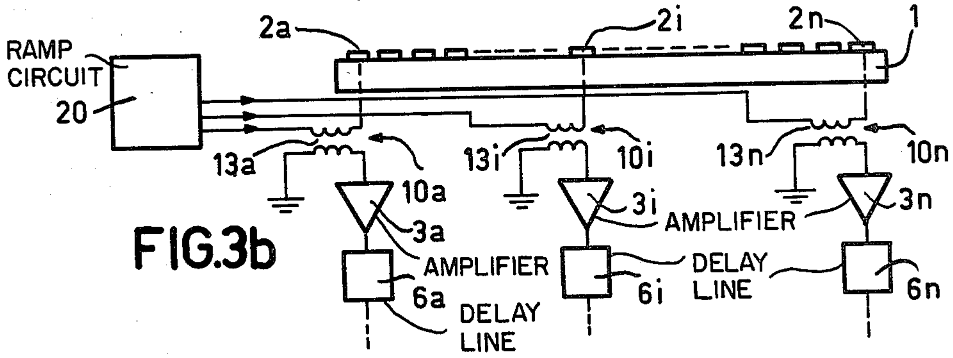

FIGS. 3*a* and 3*b* show two embodiments of the processing circuit in accordance with the invention.

In focusing echographs, the circuit for processing the electrical signals supplied by a mosaic 1 (a linear array in the embodiment shown in FIG. 1) of individual ultrasonic transducers 2*a* to 2*n* in accordance with the echos received after the emission of ultrasonic waves by these transducers (or possibly by one or more distinct transducers not shown) generally comprises, per processing channel i (i varying from a to n) connected behind these transducers: an output electrode, an amplifier 3*i* whose input is connected to this electrode, a multiplier circuit 4*i*, one input of which receives the output signal of the amplifier 3*i* whilst another input receives the output signal of a circuit 5*i* for generating a variable voltage ramp, a delay line 6*i*, and finally a set of known analog circuits which are not shown (behind the multiplier circuit 4*i*, alternatively an analog/numerical converter may be provided, followed by a set of numerical circuits instead of the structure to be described hereinafter).

Figure 2:
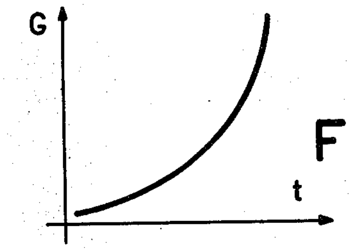
FIG. 2 shows an embodiment in which it is necessary to present the gain curve as a function of time in each processing channel for the echo signals.

Taking into account the absorption of the ultrasonic waves by the tissue or the structure traversed, leading to a substantial dynamic range of the echos received and hence of the electrical signals corresponding thereto, gain compensation, provided by the multiplier circuits, is absolutely necessary and should be realized so that the gain varies in time in accordance with a curve which is inversely proportional to the curve representing the attenuation of the ultrasonic signals within the structure examined (see FIG. 2 which shows the gain curve). Because focusing is an extremely accurate signal processing operation, the multiplier circuits have to be identical and should, therefore, be very precise themselves; however, this is not always realized in practice.

Figure 1:
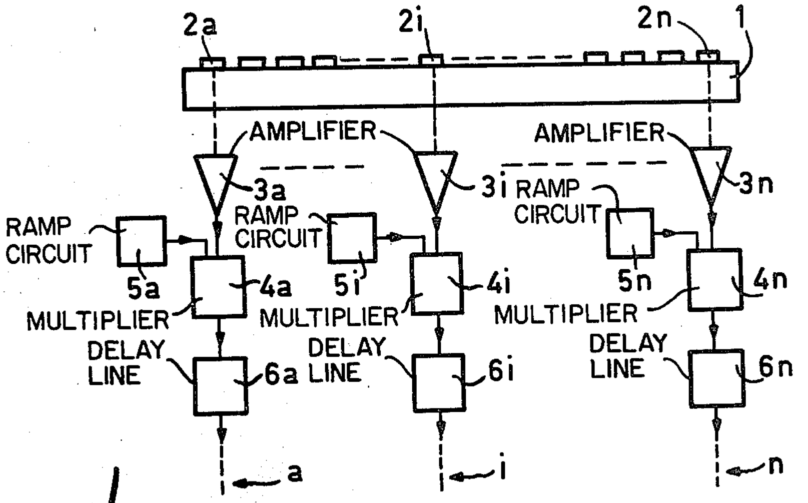
FIG. 1 shows an embodiment of a processing circuit of a known type.

Thus, in comparison with the circuit shown in FIG. 1, each processing channel i of the processing circuit in accordance with the invention (see the FIGS. 3*a* and 3*b*) comprises a coupling circuit 10*i* for coupling the electrode or the electrodes whereto this channel i corresponds to a polarization stage which is common to all individual transducers 2*a* to 2*n* of the mosaic. The mosaic is made of an electrostrictive material which supplies a signal only if it has been polarized in advance, the polarization stage for the transducers constituting the mosaic being a single circuit 20 for generating a voltage ramp having a waveform which is the inverse or approximately the inverse of that of the curve representing the attenuation of the ultrasonic signals in the structures examined. The electrical field thus applied to the electrostrictive material by the application of a single polarization voltage to each of the electrodes is identical for each of the transducers at a given instant, and the variation in time of the voltage supplied by the circuit 20 which varies inversely proportionally to the attenuation curve of the ultrasonic signals ensures that the sensitivity of each transducer, and hence the gain of each processing channel increase in the same manner in order to compensate for said attenuation. The processing circuit in accordance with the invention thus eliminates the use of the multiplier circuits which are difficult to realize, as has already been described.

In accordance with the present embodiment, the coupling circuit 10*i* comprises, for example, a circuit of the type RC (see FIG. 3*a*) whose capacitor 11*i* is connected in series with the processing channel in order to avoid the polarization voltage cannot be superposed on the receive signal during its processing, and whose resistor 12*i* is connected in series with the circuit 20 for generating the voltage ramp, or comprises a transformer 13*i* (see FIG. 3*b*). In the one or the other case, each coupling circuit 10*i* is inserted between the output of the relevant transducer (transducers) and the input of the amplifier 3*i* of the corresponding processing channel.

It is to be understood that the present invention is not limited to the embodiments described; on the basis thereof, several alternatives are feasible within the scope of the invention. Notably, other types of coupling circuit can be provided, for as long as they enable the application of the polarization voltage to the electrodes while inhibiting the transmission of this voltage to the part of the processing channels situated behind the coupling circuits (by a filtering effect preventing the passage of the low frequency signals).

It is to be noted that triglycine sulphate is a particularly suitable electrostrictive material with nonremanent polarization, but other materials may also be used for realizing the mosaic, for example, materials having a Curie point which is lower than that of triglycine sulphate, and notably mixtures on the basis of triglycine sulphate.

What is claimed is:

1. An ultrasound examination apparatus, comprising at least one transducer for the repeated emission of ultrasonic signals and, for the reception of ultrasonic signals, a mosaic of individual ultrasonic transducers which are made of an electrostrictive material with a nonremanent polarization which is applied to each individual transducer by a corresponding electrode which is connected to a polarization stage, characterized in that it comprises a processing circuit for the echo signals supplied by the individual transducers in which each of the processing channels associated with one or with several individual transducers comprises coupling means (10*i*) which serve to couple the electrodes to the polarization stage and which enable the application of a polarization voltage to each of the electrodes while inhibiting the transmission of this voltage to the part of the processing channels which is situated behind the coupling means, said polarization stage comprising a single circuit (20) for generating a voltage ramp having a waveform which is approximately the inverse of that of the curve of the attenuation of the ultrasonic signals within the structures examined.

2. An apparatus as claimed in claim 1, characterized in that the coupling means comprise a circuit of the type RC whose capacitor (11*i*) is connected in series with the processing channel and whose resistor (12*i*) is connected in series with the circuit (20) for generating the voltage ramp.

3. An apparatus as claimed in claim 1, characterized in that the coupling means comprise a transformer (13*i*).

* * * * *